(12) United States Patent
Kindorf et al.

(10) Patent No.: US 6,704,799 B1
(45) Date of Patent: Mar. 9, 2004

(54) TIME-EFFICIENT INTER-PROCESS COMMUNICATION IN A HARMONIC RATE SYSTEM

(75) Inventors: Gary Corbett Kindorf, Glendale, AZ (US); Aaron Raymond Larson, Shoreview, MN (US)

(73) Assignee: Honeywell Inc., Morristown, NJ (US)

(*) Notice: Subject to any disclaimer, the term of this patent is extended or adjusted under 35 U.S.C. 154(b) by 0 days.

(21) Appl. No.: 09/222,155

(22) Filed: Dec. 29, 1998

(51) Int. Cl.$^7$ ................................ G06F 9/46
(52) U.S. Cl. .................. 709/312; 711/147; 710/56
(58) Field of Search ................ 709/312, 313; 710/33, 52–60; 711/147

(56) References Cited

U.S. PATENT DOCUMENTS

| | | | | |
|---|---|---|---|---|
| 5,652,885 | A | * | 7/1997 | Reed .............................. 713/1 |
| 6,012,085 | A | * | 1/2000 | Yohe .......................... 709/217 |
| 6,067,604 | A | * | 5/2000 | Ramachandran et al. ... 711/149 |
| 2001/0056457 | A1 | * | 12/2001 | Kikuchi ...................... 709/104 |

OTHER PUBLICATIONS

Richard Gerber, Seongsoo Hong, and Manas Saksena, "Guaranteeing Real–Time Requirements with Resource–Based Calibration of Periodic Processes," Jul. 1995, IEEE, p. 1–29.*

David K. Y. Yau and Simon S. Lam, "Adaptive rate–controlled scheduling for multimedia applications," 1996, IEEE/ACM Transactions on Networking (TON), p. 129–140.*

* cited by examiner

Primary Examiner—John Follansbee
Assistant Examiner—Li B. Zhen (57) ABSTRACT

A time-efficient inter-process communication method (50, 60) and protocol allowing producers and consumers to execute at any combination of periods, where producers (12) and consumers (14, 16, 18) are isolated from execution ordering variations. The method and protocol is for periodic broadcast-type inter-process communication in a harmonic rate system. The system has a plurality of threads sharing a memory space (42) and including consuming threads and producing threads having potentially different rates. The producing threads have a period and are adapted to produce a message consumable by said consuming threads. The memory space (42) includes a plurality of buffers (44) for messages produced. The method includes the step of writing (58) a copy of said produced message to a buffer in said memory space during said producing thread's period, wherein only one copy of said produced message is written, regardless of the difference in rates between producing and consuming threads.

20 Claims, 10 Drawing Sheets

TIME-EFFICIENT INTER-PROCESS COMMUNICATION IN A HARMONIC RATE SYSTEM

TECHNICAL FIELD

The present invention relates to a method and protocol for inter-process communication in a harmonic multi-rate computer system.

BACKGROUND OF THE INVENTION

Figure 1:
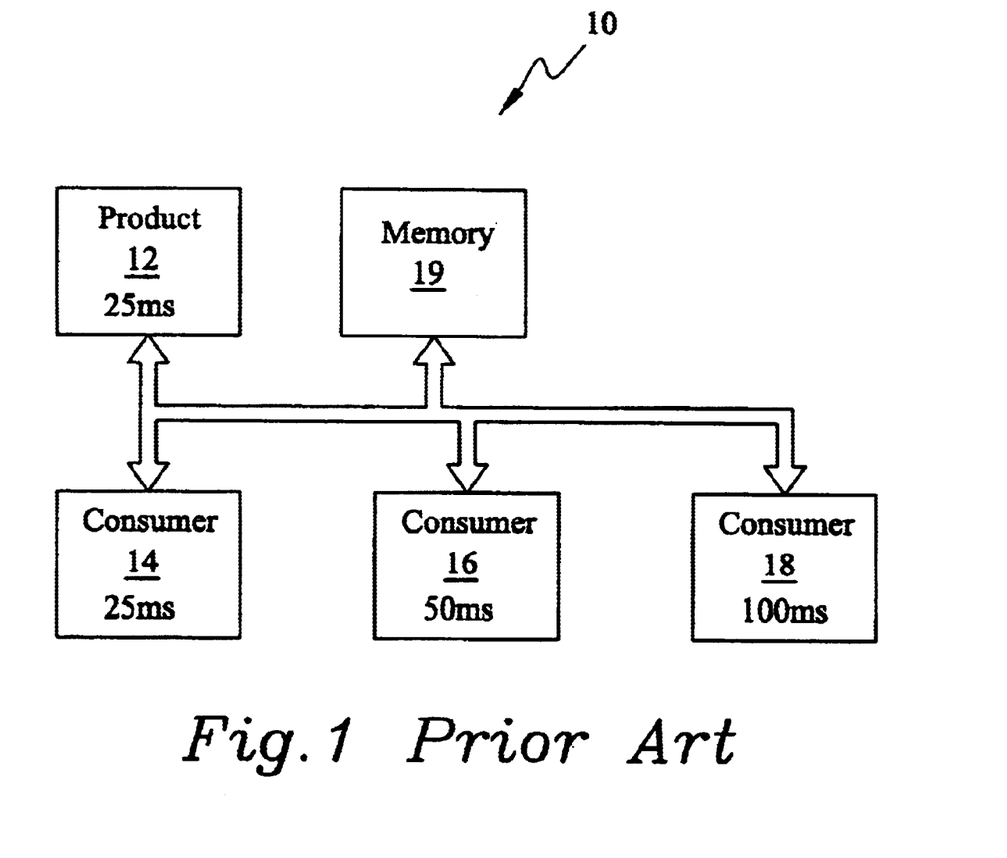
FIG. 1 illustrates broadcast-type inter-process communication from one producer to many consumers.

Within multi-rate environments, it is often desired and necessary to communicate between many user processes. FIG. 1 shows a broadcast type of protocol where messages are sent from a producer 12 to a plurality of consumers 14, 16, and 18. In addition to being broadcast, some types of inter-process communications are periodic, with producers expected to produce a message every period. Any time two user processes communicate with each other, the consumer must have access to the message produced. Various protocols are used to prevent producers from attempting to store messages into the memory simultaneously being accessed by consumers retrieving messages. One protocol commonly used is a ping-pong buffer that allows consumers to access one memory bank (ping) while the producer writes to the opposite bank (pong).

Systems having multiple rates require many ping/pong memory buffers, typically a ping/pong buffer for each unique sender/receiver rate pair. This configuration creates inefficiencies and slows the system down. For example, a message being consumed by consumers having two different rates requires the creation of two physical copies of the message. The present invention solves these problems of the prior art by providing a time-efficient method and protocol for storing messages for retrieval by consumers, requiring reduced message copying.

SUMMARY OF THE INVENTION

The present invention achieves technical advantages as a time-efficient inter-process communicating protocol and method within a harmonic rate system that permits producers and consumers to execute at any combination of rates, and isolates producers and consumers from execution order variations.

In one embodiment, disclosed is a method for periodic broadcast-type inter-process communication for use in a harmonic rate system. The system has a plurality of threads sharing a memory space, where the threads include consuming threads and producing threads have potentially different rates. The producing threads have a period and are adapted to produce a message consumable by the consuming threads. The memory space includes a plurality of buffers for messages produced. The method includes the step of writing a copy of the produced message to a buffer in the memory space during the producing thread's period. Only one copy of the produced message is written, regardless of the difference in rates between producing and consuming threads.

In another embodiment, disclosed is a protocol for periodic broadcast-type inter-process communication for use in a harmonic rate system. The system has a plurality of threads sharing a memory space and including consuming threads and producing threads having potentially different rates. The producing threads having a period and are adapted to produce a message consumable by the consuming threads. The memory space includes a plurality of buffers for messages produced, where the plurality of buffers include two buffers for each of the rates. The protocol involves writing a copy of the produced message to a buffer in the memory space during the producing thread's period, where only one copy of the produced message is written, regardless of the difference in rates between producing and consuming threads.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF PREFERRED EMBODIMENTS

Wherever appropriate, the following definitions are applied to the following terms:

Atomic access—access to a memory buffer while ensuring the buffer contents are unchanging during the access.

Harmonic Rate System—a system where each rate is an integral number of the next fastest rate. For example, the rates 25 ms, 50 ms, and 200 ms could be supported by a harmonic rate system. However, the rates 25 ms, 50 ms and 75 ms could not, because 75 is not evenly divisible by 50.

Period—The duration of one of a set of rates at which threads can execute. The length of a period is equal to the inverse of the rate; e.g. a 40 Hz rate has a period of 25 ms, and 20 Hz and 10 Hz rates have periods of 50 ms and 100 ms, respectively.

Hyperperiod—the longest period supported. At the beginning of the hyperperiod, all periods align and start simultaneously.

Period Index—a counter that counts from 0 to (2*number of fastest periods in the hyperperiod)−1, and increments with the start of each fastest period.

Thread—an active entity having a period, typically associated with a source code function.

In multi-threaded systems, various protocols are used to prevent producing threads from attempting to store messages into the memory simultaneously with consuming threads retrieving messages. For example, a producer of a message may run at a rate of 25 ms, meaning that every 25 ms the producing thread runs for some duration. During that time, the producer produces a message, such as the air speed of an aircraft in an avionics system. If another thread in the system, also running at 25 ms, wants to consume this message, some sort of protocol such as a binary semaphore or mutex is required to prevent simultaneous accessing of the memory in which the air speed message is stored.

A more common approach is to utilize multiple message buffers. In a simple system where both the producer and consumer have the same period, two buffers, hereafter called ping and pong, are typically used to solve the problem. The producer writes to the ping buffer while the consumer reads the pong buffer. At the next period, the producer and consumer exchange the buffers they use and continue.

In some inter-process communication models 10 such as the one shown in FIG. 1, threads executing at different rates are allowed to communicate with each other. A producer 12 stores its message in memory 19 for retrieval by consumers 14, 16 and 18. For example, one message may be communicated by a producer 12 every 25 ms, whereas other messages may be communicated every 50 ms or 100 ms. A problem arises when the producer running at 25 ms produces to a consumer 14 running at 25 ms and also to a consumer 16 running at 50 ms. A single ping/pong pair of buffers is no longer sufficient. A pair of buffers is required for every different consumer rate. And when the periods align, for example, the 25 ms and 50 ms periods start at the same time every 50 ms, the message must be copied into one of the buffers associated with each aligned period. Writing to this, the 50 ms buffer allows the 50 ms consumer to read the message over the next 50 ms without having it updated. In the example, a total of four buffers are required; a ping and pong buffer for consumer 12 and a ping and pong buffer for consumer 14.

Figure 2:
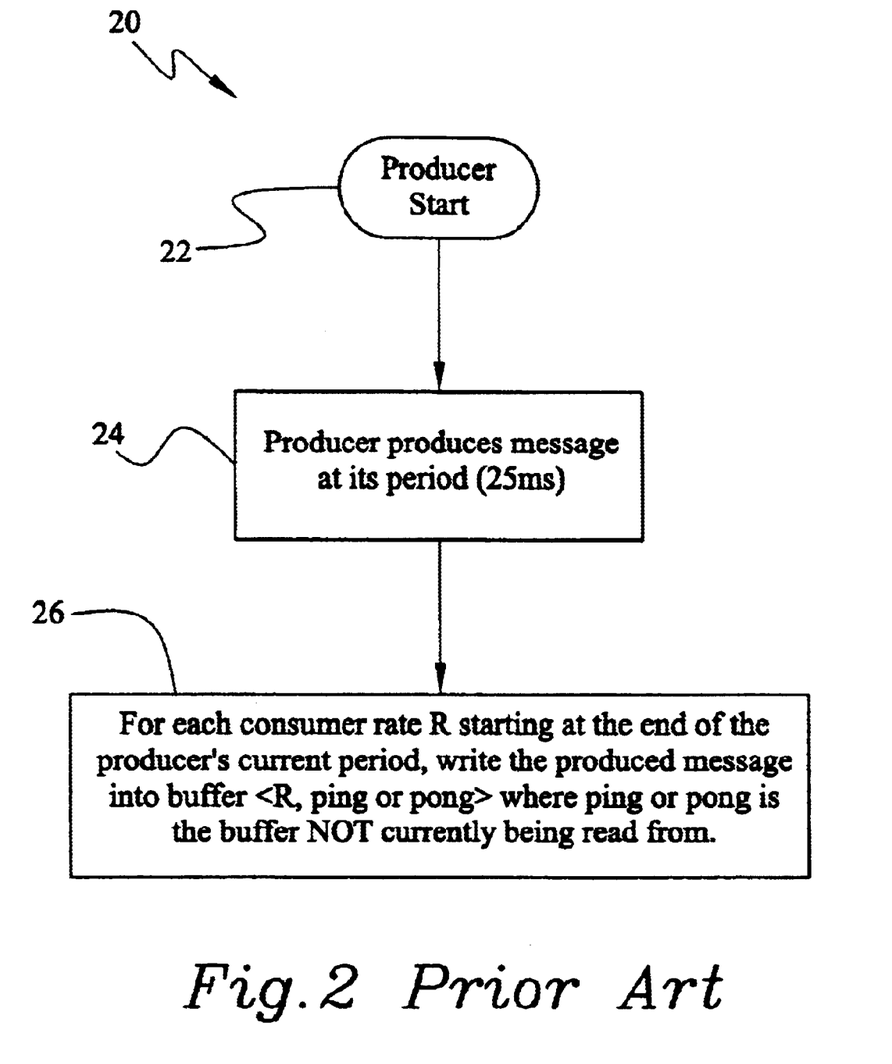
FIG. 2 illustrates a prior art flow chart for a broadcast-type communication from one producer to consumers executing at different rates.
Figure 3:
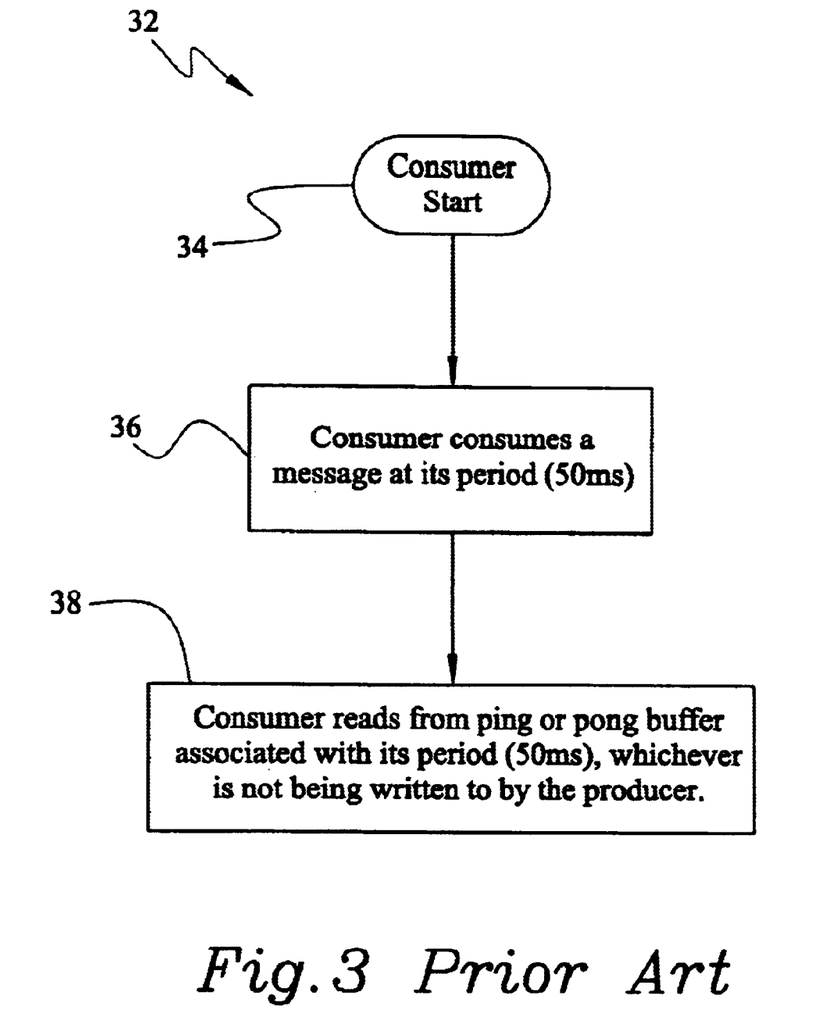
FIG. 3 illustrates a prior art flow chart for the consumption of a broadcast-type periodic message.

FIG. 2 shows a flow chart 20 for a producer 12 in the ping/pong mechanism of the prior art. The producer 12 starts (step 22) and the producer 12 produces a message at its rate, for example, 25 ms (step 24). If there are any consumer (14, 16, 18) rates starting at the end of the producer's current period, the producer writes to the buffer, either ping or pong, not being read by the consumer (step 26) for each different consumer rate. Concurrently, consumers consume messages according to the process shown in the consumer flow chart 32 of FIG. 3. The consumer 16 starts (step 34) and then the consumer 16 consumes a message at its rate, for example, 50 ms (step 36). The consumer 16 then reads from the buffer, either ping or pong, associated with 50 ms not being written to by the producer (step 38). Similarly, consumers 14 and 18 consume messages at their rates, and read from the ping or pong buffer of the memory 19 not being written to by the producer 12 (not shown).

Figure 4:
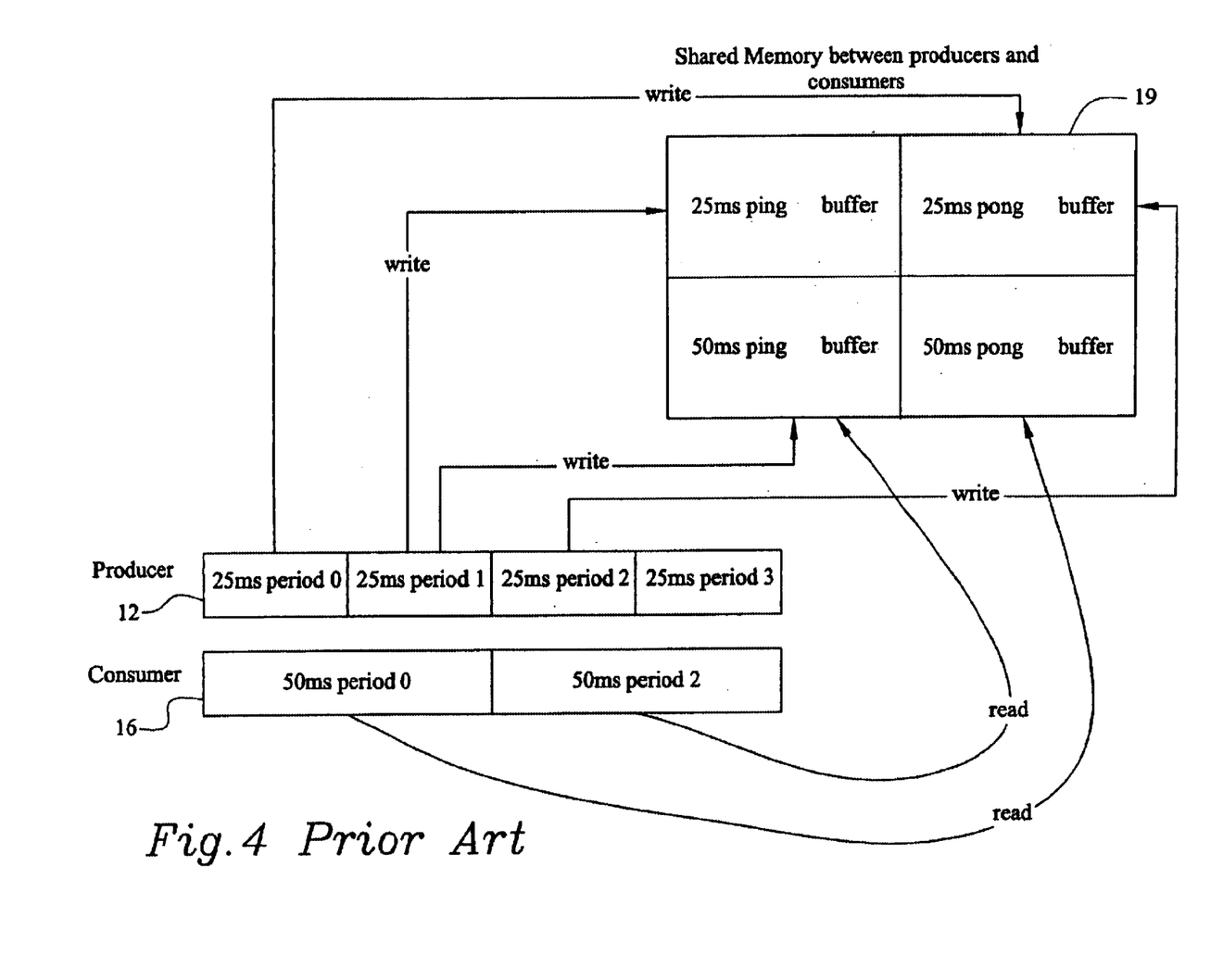
FIG. 4 shows a prior art storage process diagram.

FIG. 4 is a prior art storage and retrieval process diagram showing a memory 19 being shared by producers 12 and consumers 16. The memory comprises a ping and pong buffer for each rate in the system. At period 0, the producer 12 writes to one of the 25 ms buffers in memory 19. Only one write takes place because at the end of the producer's 12 period, no other periods start. At period 1, the 25 ms producer writes to the other 25 ms buffer. At the end of that 25 ms period, both the 25 ms period and the 50 ms period start, so a second write to memory takes place, this time to one of the 50 ms buffers. The 50 ms consumer reads from a buffer that is updated immediately prior to its period, and does not get updated until after its 50 ms period is over.

A problem with this prior art protocol is that it requires writing the message many times, in an amount equal to the number of periods aligning at the end of the producer's current period. When periods align, the produced message must be copied n times, where n is the number of periods aligning. The worst case is the hyperperiod boundary where all periods align. This traditional approach of the prior art results in system performance that is not constant, but rather, varies with the number of periods at which consumers execute.

The present invention achieves technical advantages by providing an improved method of broadcast-type inter-process communication, allowing producers and consumers to efficiently execute at any combination of periods. The present invention also isolates producers and consumers from execution ordering variations, for example, a producer may run before or after a consumer. This invention involves a novel approach inspired by the key observation that at the end of any producer's period, there is a slowest period that will start. If the buffer associated with the slowest period that starts at the end of the producers' period is written to, all consumers of that rate and faster may read that same message with all the guarantees otherwise afforded, such as atomic access. Based on this observation, there exists a solution making it possible to write a produced message only once, regardless of the rates of consumers. The solution may be manifested as a table directing producers and consumers to particular buffers given system and thread attribute information, or it may be manifested as an algorithm executed at run-time, or in some other way. For ease of understanding, the solution is described as a table-driven solution. Two tables are utilized; a "producer indices" and a "consumer indices" table. Producers and consumers access the tables to determine which buffer to use, to be described further herein.

Figure 5:
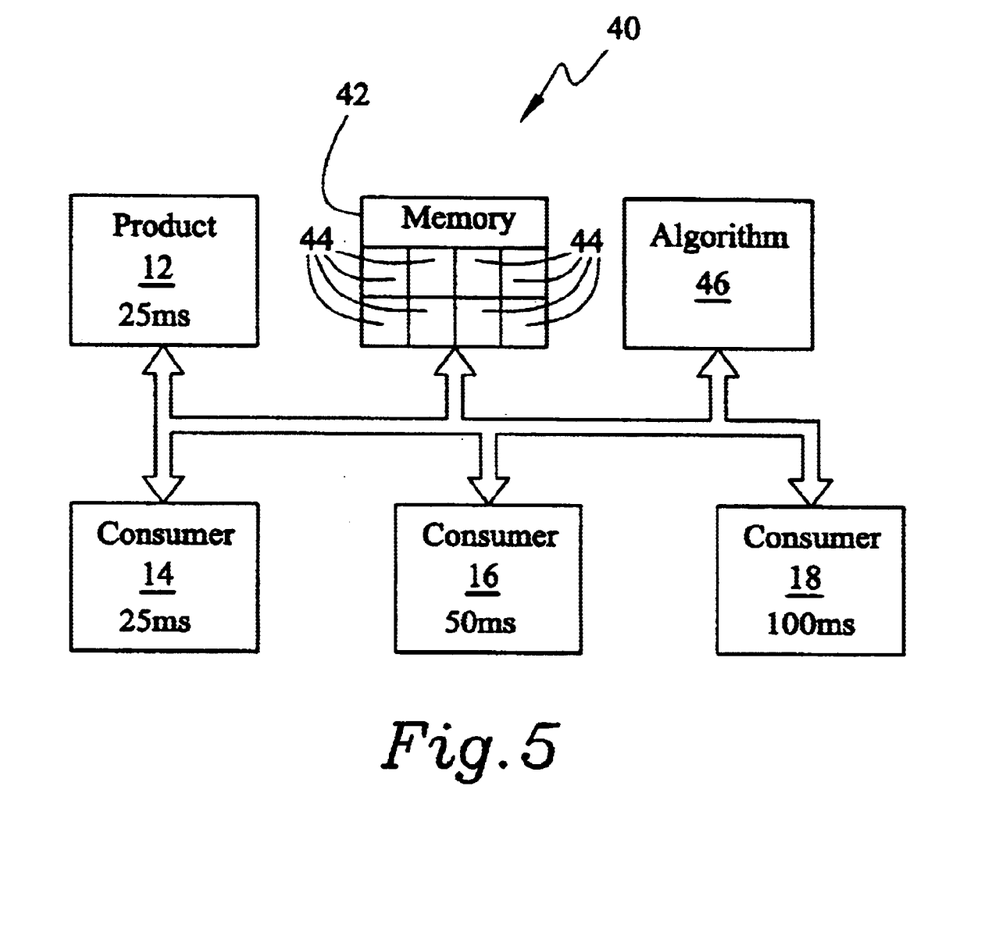
FIG. 5 shows a system architecture of the present invention.

FIG. 5 shows a diagram of the inter-process communication mechanism 40 of the present invention. The mechanism 40 includes at least one producer 12 producing messages at a particular rate (25 ms in this example), and a plurality of consumers 14, 16 and 18 reading messages at a variety of rates (25 ms, 50 ms and 100 ms, respectively, as shown). There may be other producers and consumers communicating in the system 40, not shown. Also included is a memory 42 having a plurality of buffers 44, and an algorithm 46 for selecting a particular buffer 44 for the producer 12 to store messages into, and for selecting a particular buffer 44 for a consumer 14, 16 or 18 to read messages from, at particular times. The memory 42 may reside anywhere so long as it is writable by producers 12 and readable by consumers 14, 16 and 18.

The inter-process communication mechanism 40 has several requirements. Threads in the system are periodic; that is, they are activated at a fixed interval or period, and there is a period boundary at which all periods begin, called the hyperperiod boundary. The type of communication supported is broadcast, with one producer and potentially many consumers, and also periodic, meaning that producers are required to produce a message every period. The system or device implementing the mechanism 40 must have the ability to share memory 42 between threads. Consumers 14, 16, and 18 must be able to read the memory 42 that the producers 12 produce into. For each message produced, the producer is required to reserve enough memory 42 to buffer the message (2*the number-of-fastest-periods-in-the-hyperperiod) times. There are two message buffers 44 per rate supported which are called "ping" and "pong." Threads must have access to a period counter or period index that is equal to zero at the start of the hyperperiod, increments with the fastest period, and is reset to zero every other hyperperiod. Threads must also have the ability to determine their period at run-time.

Consuming and producing threads have certain guarantees in the present invention. First, during a consuming thread's period, a consuming thread is guaranteed atomic access to the produced message. Second, the invention guarantees that a message produced immediately prior to the consumer's period is the one that is available for the consuming thread to consume; that is, the freshest copy will be available.

Figure 6:
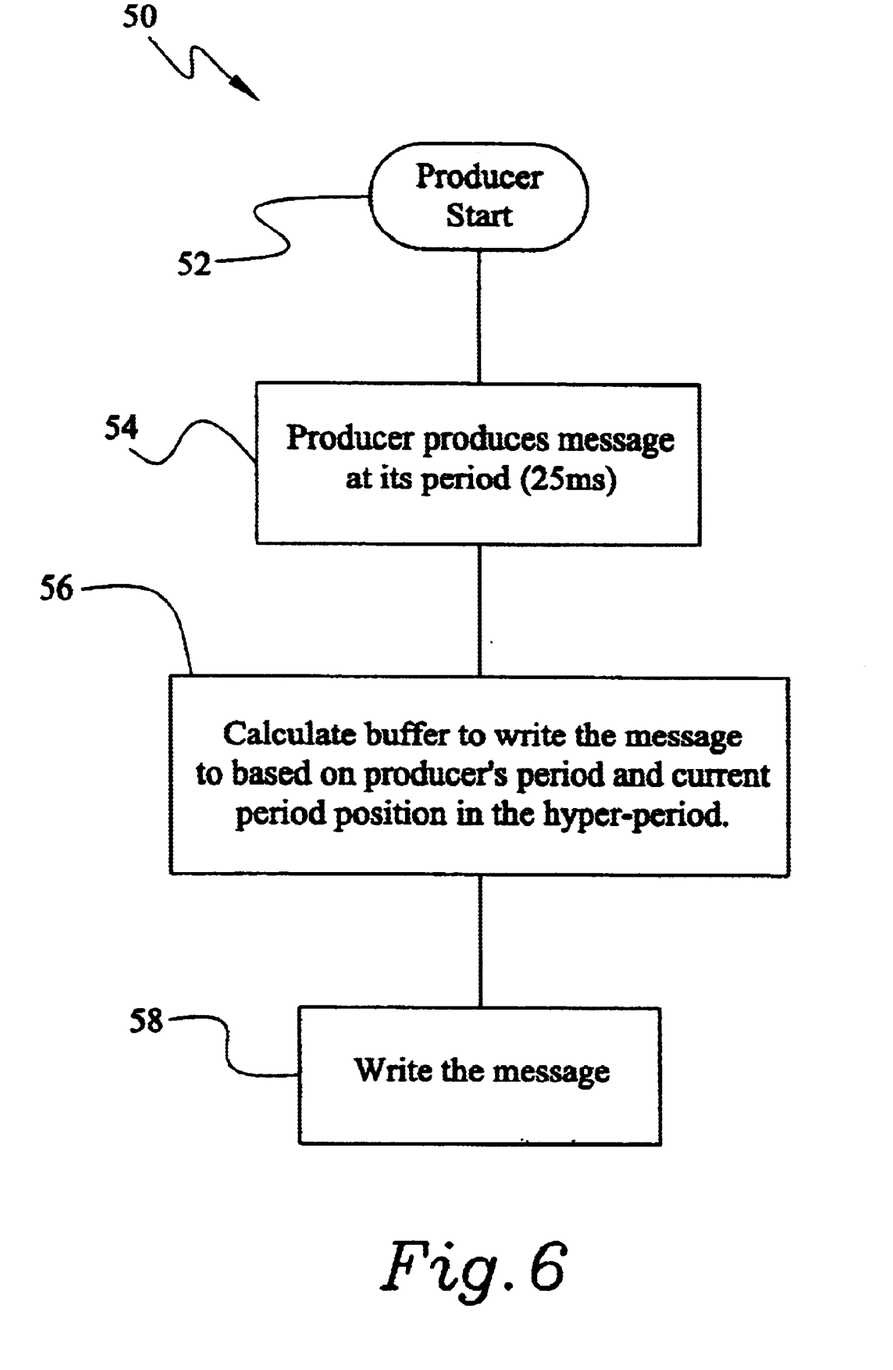
FIG. 6 shows a flow chart for a producer in an embodiment of the present invention.
Figure 7:
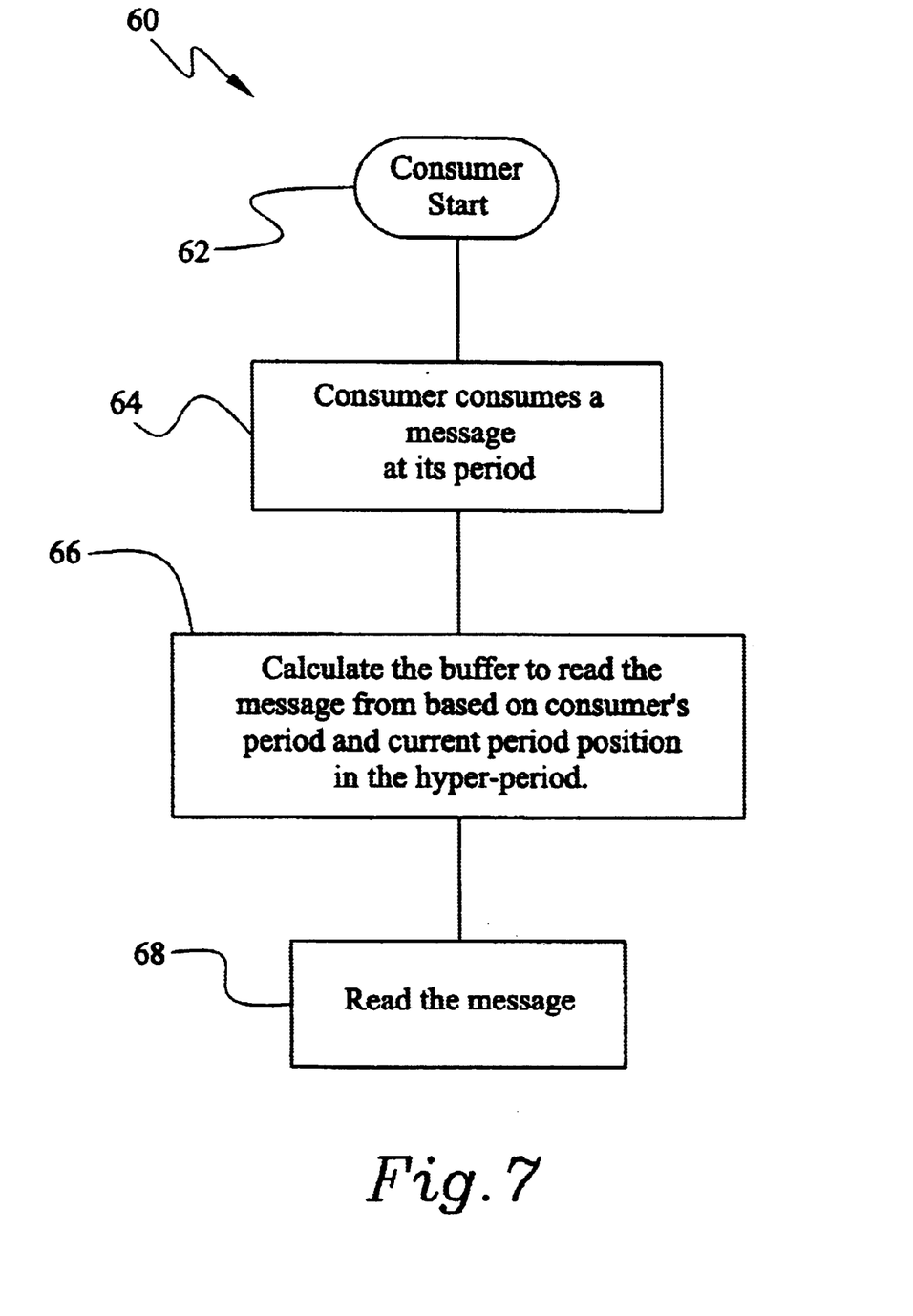
FIG. 7 shows a flow chart for a consumer in an embodiment of the present invention.

Shown in FIG. 6 is a flow chart 50 for a producer 12 in a preferred embodiment of the present invention. The producer 12 starts (step 52), and the producer 12 produces a message at its period of 25 ms (step 54). Then a buffer 44 of the memory 42 is calculated or selected to write the message to, based on the producer's period and current period position in the hyperperiod (step 56). The message is written to the selected buffer 44 (step 58) of the memory 42. Concurrently, a consumer reads the message according to the flow chart 60 shown in FIG. 7. A consumer such as 14, 16 or 18 starts (step 62) and selects a buffer to read from, based on its position in the hyperperiod and its rate (step 64). Then the consumer reads the message (step 68). Each consumer consumes according to a similar flow chart for its data rate (not shown).

The algorithm 46 of the present invention preferably calculates which buffer 44 to produce to or consume from. The algorithm 46 may be executed at run-time, or alternatively utilize two tables that may be constructed at system integration, for example. For ease of discussion, the table method will be described. The tables are indexed by thread period and period index, and are entitled Consumer Indices 80 (consumer_indices) and Producer Indices 90 (producer_indices), shown in FIGS. 8 and 9, respectively.

Figure 8:
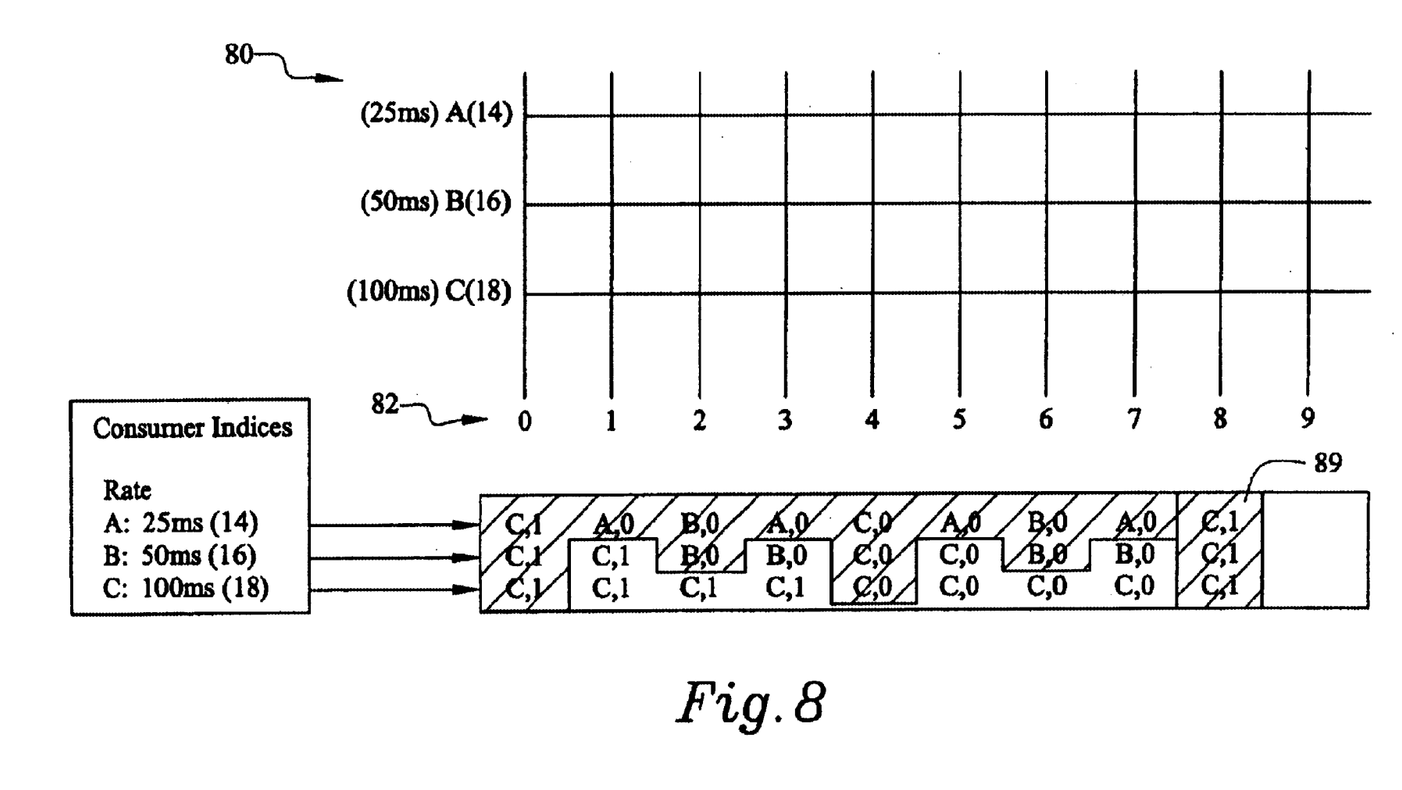
FIG. 8 illustrates an example of an implementation of the present invention.
Figure 9:
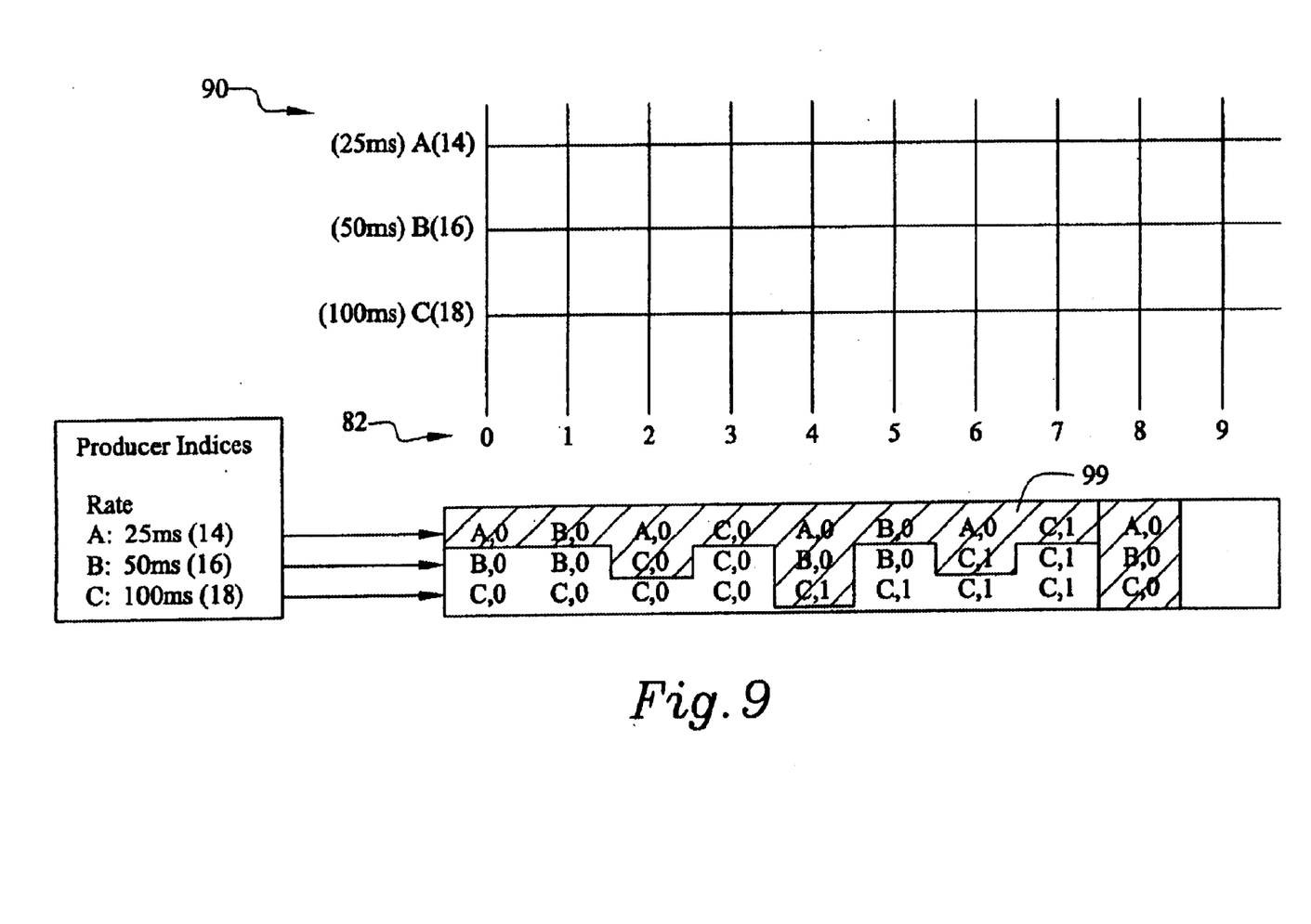
FIG. 9 illustrates an example of an implementation of the present invention.

The initial condition determination of the Consumer Indices 80 and Producer Indices 90 tables will next be described. All supported periods simultaneously start (the hyperperiod start), and the period index starts with an initial value of zero. All consumers 14, 16 and 18 consume from the slowest thread rate's "pong" buffer, and all producers 12 produce into the "ping" buffer associated with the producer's period. This particular initial condition is chosen because the slowest rate always needs both a "ping" and a "pong" buffer; however, faster rates may only require a single "ping" buffer, to be described later.

For the following equations, "ping" is defined to have the value of "0", and "pong is defined to have the value "1." The initial condition may be defined by Equations 1 and 2 below: for each rate R;

consumer_indices(R):=(slowest_rate, pong)  Equ. 1 producer_indices(R):=(R, ping)  Equ. 2

The initial condition calculated by Equ. 1 and Equ. 2 define period index 0, a hyperperiod where all periods start. Preferably a hyperperiod index is provided comprising a modulo counter, where the modulo counter is zero when the thread periods simultaneously start. The counter is incremented to (two times the number of fastest periods in the slowest period)−1. For example, at period 0, the Consumer Indices 80 (FIG. 8) indicates <C, 1>for all thread rates and the Producer Indices 90 (FIG. 9) indicates <rate,d>.

An embodiment of the algorithm 46 of the present invention is represented by the pseudo-code in Equations 3 and 4 below, where Equation 3 provides an update for the consumer_indices 80 and Equation 4 provides an update for the producer_indices 90:

Equ. 3: (Consumer Indices)
  let X=slowest period activated at this period index
  //Each rate activated consumes from buffer of slowest rate activated.
  For each rate R, X and faster
    //Copy the producer_indices entry to the consumer_indices. This includes
    //the ping/pong value.
    consumer_indices(R)=producer_indices(X)
Equ. 4 (Producer Indices)
  let Y=slowest rate activated at the end of X's period
  //Note that the slowest rate which can be activated at the end of X's period, is
  //either X's period, or a slower one.
  If(X!=Y)
    //Any Producer of rate X will produce a value which will be consumed by
    //a slower rate thread; thus, rate X producers must produce into the buffer
    //with the same producer indices that the slower rate producer is
    //producing into.
    producer$_{13}$ indices(X)=producer_indices(Y)
  else
    //X will be producing to threads at same or faster rate, so need to
    //produce into a different buffer.
    toggle producer_indices(X) ping_pong value
  end if
  //At any point where period end points line up, the slowest rate buffer is
  //the one that all faster rate threads will be consuming, so we can reset all
  //the faster producers to their ping buffer. If we have multiple of two
  //rates, this allows us to eliminate the "pong" buffer.
  for each rate R faster than X
    producer_indices(R)<R, ping>

Next, an embodiment of the present invention will be described with reference to FIGS. 8 and 9. A harmonic rate system comprises three consumers A, B, and C having three supported rates. B (50 ms) is twice as slow as A (25 ms), and C (100 ms) is twice as slow as B (50 ms). The columns of the tables 80 and 90 are indexed by the period index provided by the system, and the rows are indexed by thread rate. For example, the x-axis 82 comprises a timeline with periods 0 through 9, three of the period values being hyperperiods, at periods 0, 4, and 8. Note that the tables as described above are only as wide as two hyperperiods; periods 8 and greater repeat. The y-axis represents rates in the system A, B and C representing 25 ms, 50 ms and 100 ms, respectively. The buffer algorithm 46 cycles through the buffers 44 as shown in the table of each of the FIGS. 8 and 9 to determine which buffer to produce into, and which buffer to consume from. The determination is made by indexing the appropriate table using the rate of the threads and the current position of that threads period in the (2×hyperperiod) timeline. It is contemplated that for this particular mix of periods, not all the buffering space will be used. Note that in FIG. 8, cross-hatched portions of the table 89, and in FIG. 9, cross-hatched portions of the table 99 indicate where Equation 2 and Equation 3 direct producers and consumers to select a new buffer to use.

A thread executing at 20 Hz, or 50 ms in period 2 is instructed by the algorithm 46 to consume from buffer <B,0>, where "0" representing "ping," for example (see FIG. 8). Similarly, a thread executing at 10 ms (100 ms) in period 5 is instructed by the algorithm 46 to produce into buffer <C,1>, where "1" represents "pong" (see FIG. 9). Thus, the present invention reduces the number of buffers needed.

The present invention requires that each consumer thread receive the producer's output at the end of the producer thread's period. However, if the producer and consumer thread periods are the same, and the producer can be assured to complete its production prior to the consumer being activated, then the communication latency may be reduced, by having the consumer use the producer_indices 90 rather than the consumer$_{13}$ indices 80, thus eliminating any induced latency.

Figure 10:
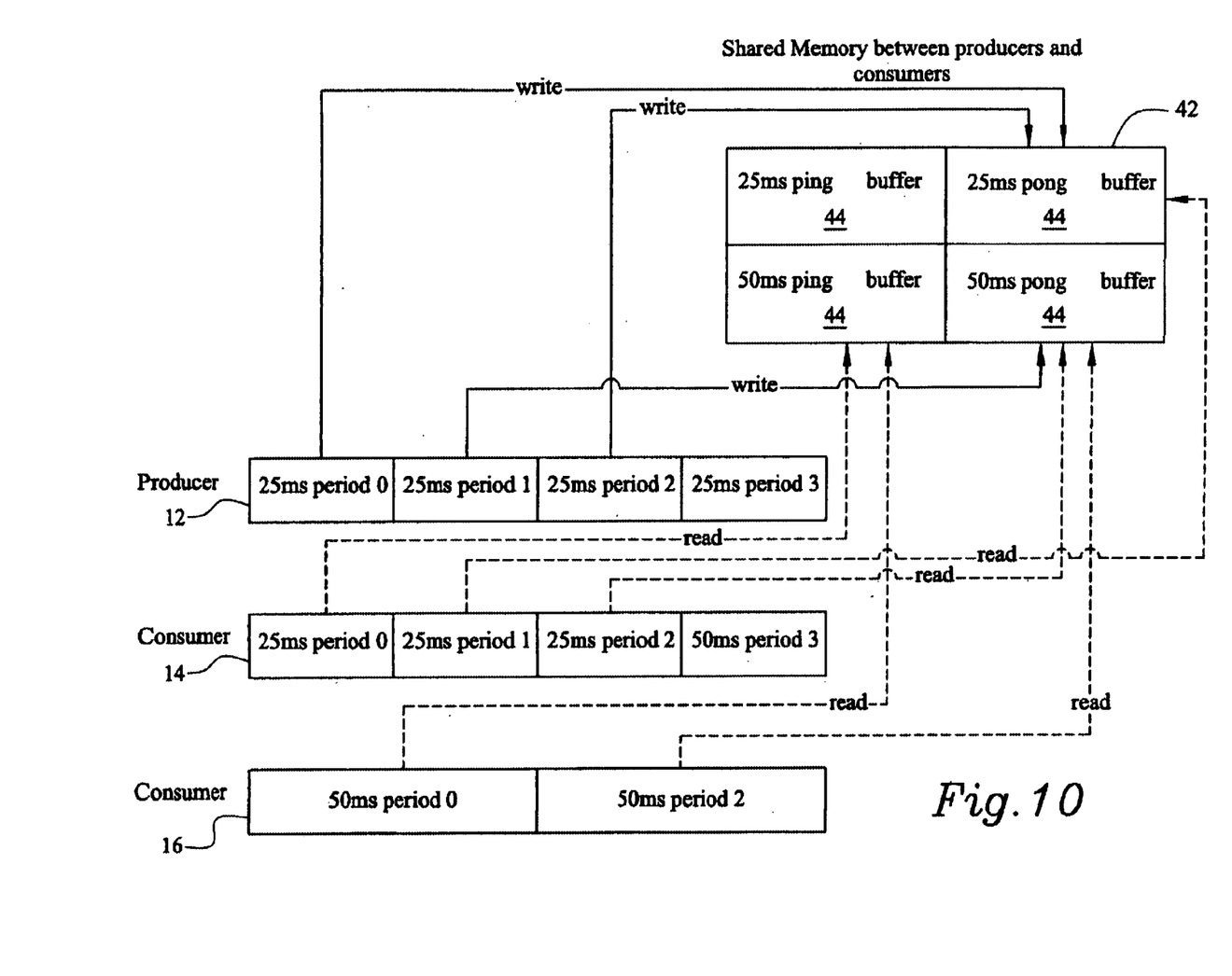
FIG. 10 shows a storage process diagram for the present invention.

A storage and retrieval diagram is shown in FIG. 10 for the present invention. At period 0, the producer 12 writes to the 25 ms pong buffer 44. At period 1, the slowest period that will start at the end of the producers period is the 50 ms period, so the producer writes its message to the 50 ms pong buffer. Beneficial features illustrated in this example are that the 50 ms consumer reads from a buffer that is updated immediately prior to its period. This buffer does not get updated until after the 50 ms period is over. The 25 ms consumer is directed to read from the same place as the 50 ms consumer. Only one copy of the produced message is written into memory 42, regardless of the difference in rates between producing and consuming threads.

An optional feature of determining freshness may be provided with the present invention. The invention requires that each producer thread produce each of its outputs every period. A "tag" word may be introduced with each buffer that identifies when a producer thread fails to run. For example, a value may be defined, called a period ID, which is incremented as the fastest period starts (like the defined period index but without the modulo operation applied). When the buffer is written, the period ID that was in effect at the beginning of the thread's period is stored in the tag word. Each consumer may then determine the freshness of the buffer by comparing the consumer thread's period ID with the tag word value. If the tag word is equal to the producer thread's period ID less the duration of the producer thread's period in period ID units, then the buffer is fresh (otherwise, it is not fresh). In instances where latency is reduced, the freshness test is just a comparison of the consumer thread's period ID and the tag word, with equal values implying freshness.

An advantage of the present invention is that if rates are a multiple of two faster than their previous rate, it is only necessary to have a single buffer 44 (for example, just a ping buffer). Another advantage is that producing and consuming threads are not required to know or be aware of each others' rates of execution. A further advantage is that only a single memory update is required per produced message regardless of the number or rate of consumers, as opposed to a copy for every rate that may consume that message, as required in the prior art, resulting in increased the time-efficiency. Furthermore, the algorithm 46 of the present invention is not disturbed by the addition or removal of periods in the system 40, nor is it sensitive to rate changes in the producing and consuming threads: performance remains constant upon such changes. Producing threads and consuming threads are partitioned from changes in rates: a producing thread may change rates without impacting consuming threads or other producing threads. Likewise, a consuming thread may change rates without impacting producing threads and other consuming threads.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for periodic broadcast-type inter-process communication for use in a harmonic rate system having a plurality of threads, said threads sharing a memory space and comprising consuming threads and producing threads, said producing threads and said consuming threads each having a period and a rate, and wherein the consuming threads include consuming threads having different rate and periods and wherein at least a portion of the consuming threads have a different rate and period than at least a portion of the producing threads, said producing threads adapted to produce messages consumable by said consuming threads, said memory space comprising a plurality of buffers for messages produced, each of the plurality of buffers corresponding to one of the periods, said method comprising the steps of:

writing one copy of each message produced by the producing threads to a selected buffer in said memory space, wherein each producing thread writes during a corresponding producing thread period and wherein the selected buffer corresponds to a slowest period that starts at the end of the corresponding producing threads period; and reading copies of produced messages, wherein each consuming thread reads during a corresponding consumer thread period, and wherein each consuming thread reads from a buffer that was written to by a producing thread in a previous period that ended prior to the start of the corresponding consumer thread period and that corresponds to a slowest period that starts at the beginning of the corresponding consumer thread period, such that atomic access for each consuming thread is assured regardless of update rate of the producing threads.

2. The method of claim 1 wherein said plurality of buffers comprise two buffers for each of said rates in said system.

3. The method of claim 1 wherein said rates are multiples of two of one another, wherein the plurality of buffers comprises two buffers for a slowest of said rates.

4. The method of claim 1, wherein said plurality of buffers comprises two buffers for a slower of said rates in said system and one buffer for a faster of said rates in said system, whereby said memory space is optimized.

5. The method of claim 1 wherein producing threads and consuming threads are partitioned from changes in rates, whereby a said producing thread may change rates without impacting said consuming threads, and other said producing threads, whereby a said consuming thread may change rates without impacting said producing threads and other said consuming threads.

6. The method of claim 1, wherein said threads comprise a first set of rates, further comprising the step of:

adding a thread having a second rate to said system, said second rate being different than any of said rates in said first set of rates, wherein said step of adding a second rate impacts only a number of buffers required in said memory.

7. The method of claim 1, wherein said threads comprise first and second rates, further comprising the step of:

removing a thread having said second rate, wherein the step of removing said rate impacts only a number of said buffers required in said memory.

8. The method of claim 3 further comprising the step of:
providing a current byperperiod index, said index comprising a modulo counter, said modulo counter being zero when said thread periods in said system simultaneously start.

9. The method of claim 8 further comprising the step of:
incrementing said modulo counter to (two times the number of fastest periods in the slowest period)−1.

10. The method of claim 9 wherein said step of selecting a buffer is based on said thread's period and the hyperperiod index value at the start of the thread's current period.

11. The method of claim 1 further comprising the step of:
providing a freshness indicator in said buffer.

12. A protocol for periodic broadcast-type inter-process communication for use in a harmonic rate system having a plurality of threads, said threads sharing a memory space and comprising consuming threads and producing threads, said producing threads and said consuming threads having a period and a rate, and wherein the consuming threads include consuming threads having different rates and periods and wherein at least a portion of the consuming threads have a different rate and period than at least a portion of the producing threads, said producing threads adapted to produce a message consumable by said consuming threads, said memory space comprising a plurality of buffers for messages produced, each of the plurality of buffers corresponding to one of the periods, said protocol comprising:

writing one copy of each message produced by the producing threads to a selected buffer in said memory space, wherein each producing thread writes during a corresponding producing thread period and wherein the selected buffer corresponds to a slowest period that starts at the end of the corresponding producing threads period; and reading copies of produced messages, wherein each consuming thread reads during a corresponding consumer thread period, and wherein each consuming thread reads from a buffer that was written to by a producing thread in a previous period that ended prior to the start of the corresponding consumer thread period and that corresponds to a slowest period that starts at the beginning of the corresponding consumer thread period, such that atomic access for each consuming thread is assured regardless of update rate of the producing threads.

13. The protocol of claim 12 wherein said rates are multiples of two of one another, wherein the plurality of buffers comprises two buffers for a slowest of said rates.

14. The protocol of claim 13 wherein faster rates comprise only one buffer, whereby said memory space is optimized.

15. The protocol of claim 12 wherein producing threads and consuming threads are partitioned from changes in rates, whereby a said producing thread may change rates without impacting said consuming threads, and other said producing threads, whereby a said consuming thread may change rates without impacting said producing threads and other said consuming threads.

16. The protocol of claim 12, wherein said threads comprise a first set of rates, further comprising:
adding a thread having a second rate to said system, said second rate being different than any of said rates in said first set of rates, wherein said step of adding a second rate impacts only a number of said buffers in said memory.

17. The protocol of claim 12, wherein said threads comprise fist and second rates, further comprising:
removing a thread having said second rate, wherein the step of removing said rate impacts only a number of said buffers required in said memory.

18. The protocol of claim 13 further comprising:
providing a current hyperperiod index, said index comprising a modulo counter, said modulo counter being zero when said thread periods in said system simultaneously start.

19. The protocol of claim 18 further comprising:
incrementing said modulo counter to (two times the number of fastest periods in the slowest period)−1.

20. The protocol of claim 19 wherein said selecting a buffer is based on said thread's period and the hyperperiod index value at the start of the thread's current period.

* * * * *